United States Patent [19]

Ascoli

[11] 4,160,177

[45] Jul. 3, 1979

[54] VIBRATORY ELECTROMAGNETIC MOTOR

[75] Inventor: Enzo Ascoli, Lausanne, Switzerland

[73] Assignee: The Gillette Company, Boston, Mass.

[21] Appl. No.: 838,537

[22] Filed: Oct. 3, 1977

[51] Int. Cl.² .............................................. H02K 7/06
[52] U.S. Cl. ..................................... 310/22; 310/24; 310/36
[58] Field of Search ...................... 310/21, 22, 25, 24, 310/32, 36, 39; 50/43.7, 45

[56] References Cited

U.S. PATENT DOCUMENTS

| | | | |
|---|---|---|---|
| 2,239,931 | 4/1941 | Prescott | 310/29 |
| 2,299,952 | 10/1942 | Jepson | 310/22 |
| 3,076,108 | 1/1963 | Oliver et al. | 310/29 |
| 3,263,105 | 7/1966 | Heyek | 310/22 X |
| 3,538,358 | 11/1970 | Baüerle | 310/29 |

*Primary Examiner*—Donovan F. Duggan
*Attorney, Agent, or Firm*—Richard A. Wise; Donald E. Mahoney

[57] ABSTRACT

A vibratory electromagnetic motor includes a stator unit, a first rotatable armature and a second rotatable armature. The armatures and the stator unit are arranged to reduce motor noise and vibrations when the armatures synchronously rotate in opposite directions in response to a magnetic force. A resilient coupling member is connected between the armatures for combining drive power generated by the first rotating armature with drive power generated by the second rotating armature.

19 Claims, 5 Drawing Figures

VIBRATORY ELECTROMAGNETIC MOTOR

BACKGROUND OF THE INVENTION

1. Field of the Invention

This invention relates to electromagnetic motors, and more particularly, to vibrator type motors of the type having plural oscillating armatures adapted to reduce undesired noise and vibrations.

2. Description of the Prior Art

A vibrator type motor or electromagnetic motor for reciprocally moving a load in response to magnetic and resilient forces is widely used in many small electric hand tools or implements such as dry shavers and hair clippers. The vibrator type motor comprises a magnetic circuit with a stator unit or stationary portion and an armature or movable portion. The stator unit includes a core generally made of laminations of magnetically permeable material providing a low reluctance path for conducting magnetic flux and a coil of insulated windings wound around the core. Magnetic flux is induced in the core in response to an electrical signal coupled to the coil. The core may be U-shaped with free ends terminating in salient stator poles or protrusions with one or more pole faces. The armature is also made of laminations of magnetically permeable material formed to provide salient armature poles with one or more pole faces. The stator unit is immovably mounted on a motor mount or housing while the armature is pivotally mounted on the motor mount so that the salient armature poles have pole faces separated from pole faces of adjacent stator poles by an air gap. Resilient means, such as springs, are arranged to maintain the armature in a preferred rest position where the armature pole faces are angularly displaced from the adjacent stator pole faces. It is well known that the armature and stator pole faces bounding the air gap attract each other when the core is magnetized by coupling an alternating current (AC) signal to the windings. The AC signal induces a magnetic flux in the core and a resulting magnetic field in the air gap which causes the armature to be rotated in a preferred direction against the bias forces provided by the springs, until the stator and armature pole faces are in substantial alignment. When the amplitude of the first half wave of the AC signal is reduced from a peak value to zero, the magnetic field breaks down and the elastic properties of the stressed springs cause the armature to rotate in an opposite direction, back to the neutral or rest position to complete one cycle of armature movement. A succeeding half wave of the AC signal starts the armature moving again toward the position of stator and armature pole face alignment to eventually complete a second cycle of armature movement. Thus, it will be appreciated that the armature oscillates at twice the frequency of the AC input signal in response to a magnetic force having a periodically varying amplitude.

In general, when a periodically varying force is applied to a body mounted on springs or other elastic supports, the body will vibrate. Thus, it will be appreciated that vibratory motors of the type described above tend to produce a reaction force causing excessive noise and external vibrations in the motor and its housing. The frequency of the external vibrations is directly proportional to the frequency of the armature oscillation. The magnitude of the external vibrations depends partly on the moment of inertia of the armature. Attemps to minimize noise and vibrations in a vibratory motor include various arrangements which minimize the moment of inertia of the armature. For example, U.S. Pat. No. 3,493,793, "Hair Clipper Having Oscillating Armature Motor" issued to P. W. Niemela on Feb. 3, 1970, discloses the use of a stator including an E-shaped core cooperating with an armature having a permanent magnet so that the armature oscillates at the frequency of the AC input signal coupled to the stator windings. In addition, the mass of the armature is minimized and means are provided for reversing the direction of armature movement with a minimum of housing vibration. For many vibratory motor applications, merely reducing the oscillating frequency of the armature to that of the AC input frequency and minimizing the mass of the armature would not reduce undesired noise and vibration to an acceptable level.

Other attempts to reduce objectionable noise and vibration to an acceptable level include arranging the vibratory motor to have multiple armatures designed to oscillate in opposite directions to balance out forces producing the noise and vibration. In U.S. Pat. No. 3,218,708, "Electrically Operated Shaver", issued to A. R. Spohr on Nov. 3, 1965, a vibratory motor is provided with multiple coiled springs for positioning a pair of armatures between opposing poles of a stator in a manner that will cause the armatures, and electric shaver cutter heads attached to each armature, to oscillate in opposite directions. However, it is sometimes difficult to achieve perfect balancing of multiple cutter heads. U.S. Pat. No. 3,144,571, "Electromagnetic Motor Having Oppositely Oscillating Armatures", issued to S. R. Kukulski on Aug. 11, 1964, and U.S. Pat. No. 2,299,952, "Vibratory Motor For Dry Shaver And The Like", issued to I. Jepson on Oct. 27, 1942, describe vibratory motors utilizing a driving armature and a secondary armature disposed between opposing poles of a stator. The driving armature is coupled to a load, such as a single cutting head in a dry shaver, and the secondary armature is connected to a counterweight. The vibratory motor is arranged so that the driving and secondary armatures pivotally oscillate in opposite directions to balance out undesired vibration causing forces. However, the secondary armature does not contribute to the force necessary to drive the load resulting in an inefficient use of motor generated energy.

Accordingly, it is desired to provide an efficiently operating vibratory motor arranged to move a load with minimum noise and vibration at any desired frequency of motor operation.

SUMMARY OF THE INVENTION

A vibratory electromagnetic motor comprises a motor mount, a stator means having a plurality of opposed poles immovably fixed to the motor mount, first and second armature means pivotally mounted on the motor mount with armature poles adjacent to the stator poles to syncronously rotate in opposite directions in response to a magnetic force, and resilient coupling means connected between the first and second armatures for combining drive power generated by the first rotating armature with drive power generated by the second rotating armature.

DESCRIPTION OF THE PREFERRED EMBODIMENT

Figure 1:
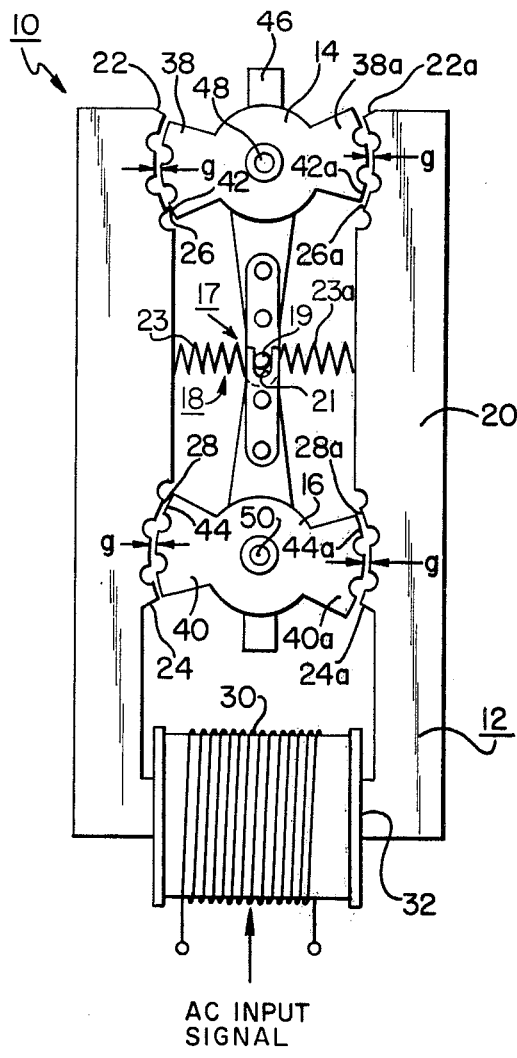
FIGS. 1 and 2 are diagrammatic top views of a vibratory motor according to the invention.
Figure 2:
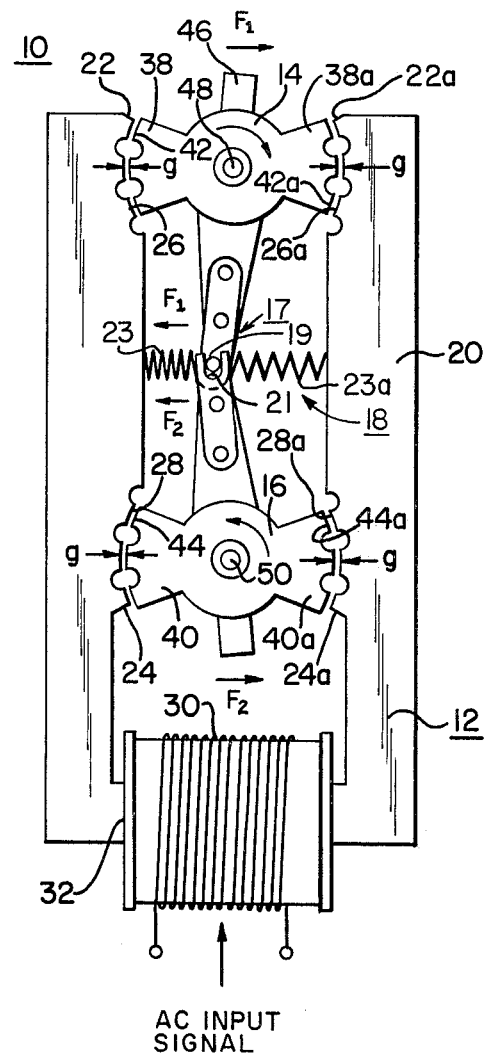

Referring to FIGS. 1 and 2, there is shown diagrammatic top views of a vibratory motor 10 arranged according to the invention. The motor 10 includes an immovable stator unit 12 and a first rotatable armature 14 coupled to a second rotatable armature 16 by coupling means 17. An example of the coupling means 17 include a pin 19 projecting from the first armature 14 and received in a slot 21 in the second armature 16. The coupling means 17 are arranged to permit the armatures 14, 16 to synchronously rotate or oscillate in opposite directions in response to a magnetic force and combine drive power generated by the first rotating armature 14 with drive power generated by the second rotating armature 16. Resilient means 18, schematically illustrated as coil springs 23, 23a, are connected between the stator unit 12 and the armatures 14, 16 to provide bias forces for establishing and restoring the rotating armatures 14, 16 to an initial or rest position relative to the stator unit 12. The resilient means 18 and armatures 14, 16 are arranged to form a resonant mechanical system tuned to a predetermined natural frequency.

Figure 3:
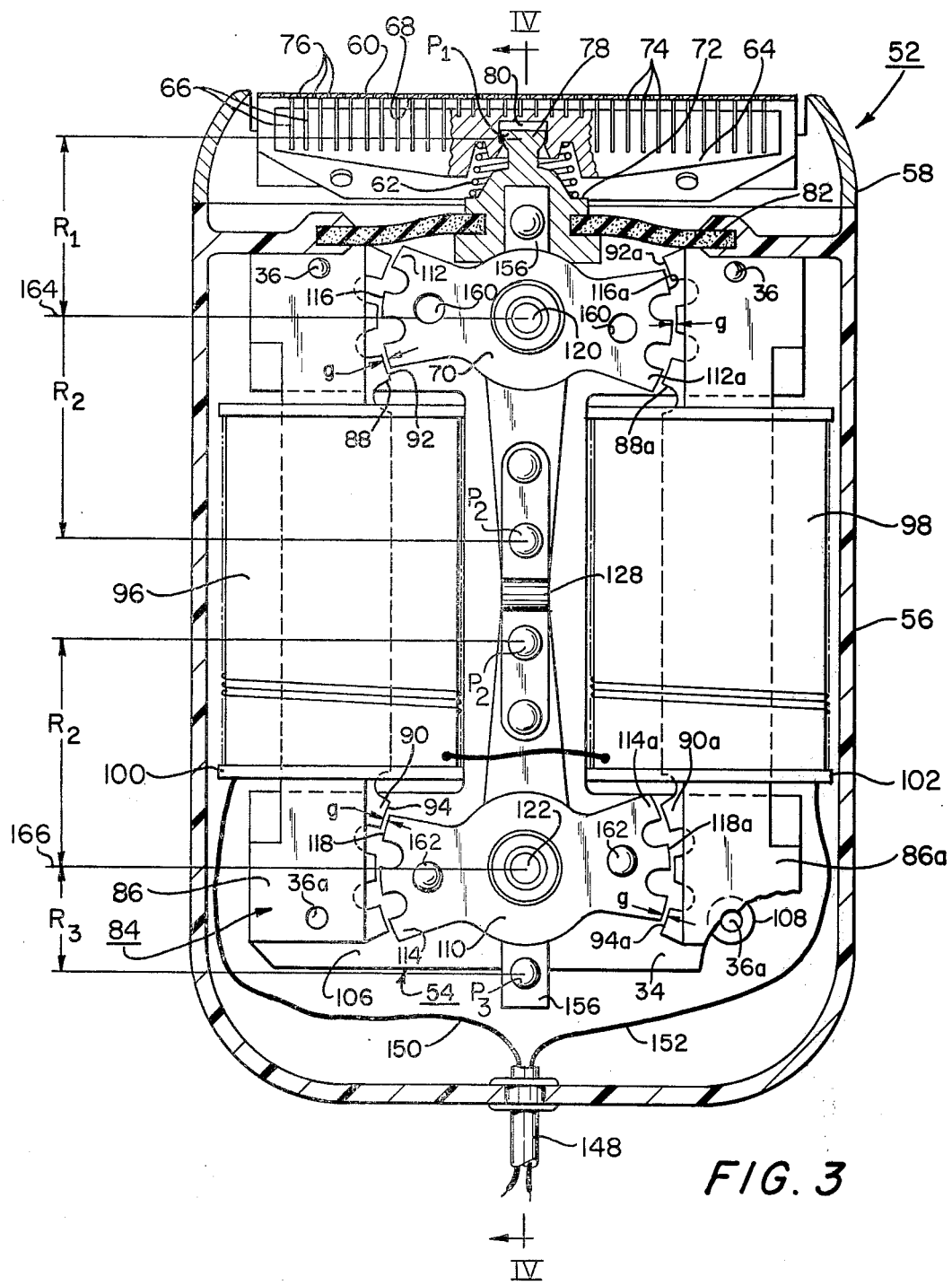
FIG. 3 is a front sectional view of an electric shaver employing the vibratory motor.
Figure 4:
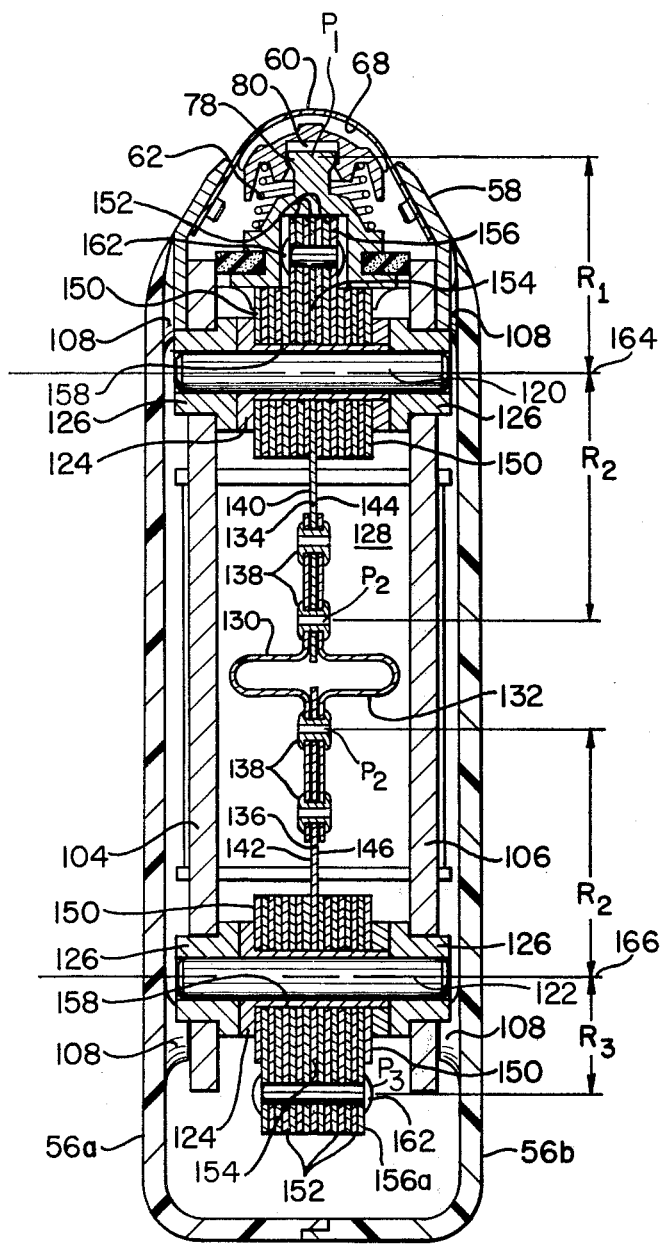
FIG. 4 is a side sectional view of the electric shaver taken along the line IV—IV of FIG. 3.

The stator unit 12 includes a laminated core 20 of magnetic steel or other magnetically permeable material forming first, 22, 22a and second 24, 24a pairs of opposing salient stator poles each having one or more pole faces 26, 26a and 28, 28a, respectively. The core 20 may be U-shaped with a coil 30 of conventional insulated windings surrounding the bight 32 of the core 20. The core 20 is immovably attached to a motor mount or housing 104, 106, as shown in FIGS. 3 and 4, and further described below.

The first 14 and second 16 armatures are laminates of magnetically permeable material formed to provide salient armature poles 38, 38a and 40, 40a on opposite ends of the armatures 14 and 16, respectively. Each armature pole 38, 38a, 40, 40a has one or more pole faces 42, 42a, 44, 44a equaling the number of pole faces 26, 26a, 28, 28a on a stator pole 22, 22a, 24, 24a. The armatures 14, 16 are mounted on the motor mount 104, 106 to pivotally move in response to an electromagnetic force. In particular, the first armature 14 is pivotally mounted between the first pair of stator poles 22, 22a, and the second armature 16 is pivotally mounted between the second pair of stator poles 24, 24a. An air gap, g, separates the armature pole faces 42, 42a, 44, 44a from adjacent pole faces 26, 26a, 28, 28a.

An AC input signal coupled to the windings 30 induces a magnetic flux with time varying intensity in the core 20. The stator unit 12 and armatures 14, 16 form a magnetic circuit in which the induced magnetic flux is conducted by the stator core 20 across the air gap, g, to the armatures 14, 16 along first and second parallel paths causing the armatures 14, 16 to pivotally oscillate between a rest position and a second position. In the initial or armature rest position, shown in FIG. 1, the armature pole faces 42, 42a, 44, 44a are angularly offset with respect to the stator pole faces 26, 26a, 28, 28a. In practice, there may be a slight overlap occurring between opposed armatures 42, 42a, 44, 44a and stator 26, 26a, 28, 28a pole faces for reducing the reluctance of the magnetic flux path between the stator unit 12 and armatures 14, 16.

In the preferred embodiment of the invention, the armature pole faces 42, 42a, 44, 44a are offset from the stator pole faces 26, 26a, 28, 28a in a manner that permits a half wave of the AC input signal to cause the armatures 14, 16 to synchronously rotate in opposite directions. For example, in FIG. 1, the first armature pole faces 42, 42a are angularly offset from adjacent stator pole faces 26, 26a so that the magnetic force of attraction between stator 22, 22a and armature 38, 38a poles causes the first armature 14 to rotate in a clockwise direction. The second armature pole faces 44, 44a are angularly offset from adjacent stator pole faces 28, 28a so that a magnetic force of attraction between stator 24, 24a and armature 40, 40a poles causes the second armature 16 to synchronously rotate in an opposite or counter-clockwise direction. The armatures 14, 16 rotate against the bias forces of the resilient member 18 until the adjacent stator 26, 26a, 28, 28a and armature 42, 42a, 44, 44a pole faces are in substantial alignment, as shown in FIG. 2, and hereinafter referred to as the second armature position. The coupling means 17 behaves as an energy conductor for combining the energy produced by each of the oppositely moving armatures to move a load (shown in FIGS. 3 and 4) connected to the first armature 14. When the adjacent stator 26, 26a, 28, 28a and armature 42, 42a, 44, 44a pole faces are in substantial alignment, the activated resilient member 18 behaves as a source of potential energy. Upon breakdown of the magnetic field, the activated resilient member 18 causes the armatures 14, 16 to synchronously rotate in reverse directions back to the rest positions of the armatures 14, 16 to complete one cycle of armature movement. The aforementioned operation is repeated in response to successive pulses of the AC input signal. Thus, it will be appreciated that the resilient member 18 is arranged to coact with the pulsating magnetic field to oscillate the armatures 14, 16 between the rest and second armature positions at twice the frequency of the AC input signal. However, unlike prior art vibratory motors, the coupling means 17 and resilient member 18 are arranged to combine drive power produced by movement of the second armature 16 with drive power produced by movement of the first armature 14 for moving a load, such as an electric shaver cutter block, coupled to a driving arm 46 attached to the first armature 14.

Undesired external vibrations of the vibratory motor 10 are reduced by forming the armatures 14, 16 so that the moment of inertia of the mass of the first armature 14 with respect to the axis of rotation 48 of the first armature 14 is substantially equal to the moment of inertia of the mass of the second armature 16 with respect to the axis of rotation 50 of the second armature. In addition, each of the armatures 14, 16 is dynamically balanced with respect to its own axis of rotation and the armature pole faces 42, 42a, 44, 44a are offset and separated from the stator pole faces 26, 26a, 28, 28a so that the angle of oscillation of the first armature 14 is substantially equal and opposite to the angle of oscillation of the second armature 16. Furthermore, the armatures 14, 16 may be designed to counter-balance forces generated when a load having known dimensions and mass is connected to the driving arm 46 of the first armature 14.

Referring to FIGS. 3 and 4, there is shown front and side views of an electric shaver 52, partially sectioned to reveal an embodiment of a vibratory motor 54 arranged according to the invention. The electric shaver 52 includes a shaver casing 56 formed by two shells 56a, 56b supporting a cutting head 58 with a perforated foil 60 or grid attached thereto. An example of a perforated shaving foil is disclosed in copending U.S. patent application Ser. No. 699,041, assigned to the assignee of the present application. A coil spring 62 is employed for flexibly supporting a cutter block 64 so that sharpened edges 74 of a plurality of blades 66 mounted on the cutter block 64 are in contact with an inner surface 68 of the shaving foil 60. The cutter block 64 is coupled to a first armature 70 via a driver member 72 attached to the first armature 70. The driver member 72 is formed with a partially spherical termination 78 that is disposed within a cylindrical cavity 80 in the cutter block 64 so as to apply forces generated by an angular movement of the first armature against point $P_1$ in the cavity 80 to cause the blade edges 74 to move against the foil inner surface 68 to cut hairs projecting through the foil apertures 76. A rubber sponge plate 82 is suitably attached to the shaver casing 56 and driving member 72 to protect the motor 54 from shaving debris.

The vibratory motor 54 includes a stator unit 84 having first 86 and second 86a laminated cores of magnetically permeable material with each core 86, 86a having opposite ends terminating in circumferentially spaced salient poles 88, 90, 88a, 90a having multiple equispaced concave pole faces 92, 94, 92a, 94a. First and second serially connected coils 96, 98 of conventional insulated windings are respectively wound around bobbins 100, 102 of insulating material surrounding the first and second cores 86, 86a. If desired, the coils 96, 98 may also be electrically connected in parallel in a manner well known in the prior art.

The cores 86, 86a are assembled or stacked between a pair of parallel plates 104, 106 comprising a motor mount. Spacers, not shown, may be used to separate the stator cores 86, 86a from the motor mount plates 104, 106. The motor mount plates 104, 106 and stator cores 86, 86a are fabricated to have holes 36a for receiving locating pins 36 extending through the stator cores 86, 86a. The pins 36 are intended to position the cores 86, 86a to provide a stator unit 84 with first 88, 88a, and second 90, 90a pairs of opposing poles. Each shell 56a, 56b of the shaver housing 56 include four bosses 108 with holes dimensioned to receive the pins 36 inserted through the stator cores 86, 86a and protruding from motor mount plates 104, 106, whereby the stator cores 86, 86a are rigidly attached to the shaver casing 56 and the motor mount plates 104, 106.

First 70 and second 110 laminated armatures made from magnetically permeable material are pivotally mounted on the motor mount plates 104, 106, coplanar with the stator cores 86, 86a. The armatures 70, 110 have opposite ends terminating in circumferentially spaced salient poles 112, 112a, 114, 114a with multiple equispaced convex pole faces 116, 116a, 118, 118a conforming to the concave shape of the stator pole faces 92, 92a, 94, 94a. The first armature 70 is pivotally mounted between the first pair of stator poles 88, 88a so that in an initial rest position adjacent stator 92, 92a and armature 116, 116a pole faces are angularly offset and separated by an air gap, g, to permit the first armature 70 to rotate in a counterclockwise direction in response to a magnetic force. The second armature 110 is pivotally mounted between the second pair of stator poles 90, 90a so that in the initial rest position, adjacent stator 94, 94a and armature 118, 118a pole faces are angularly offset and separated by an air gap, g, to permit the second armature 110 to syncronously rotate in a clockwise direction in response to a magnetic force. Means for pivotally mounting the armatures 70, 110 and establishing an axis of rotation include pivot pins 120, 122 passed through a cylindrical bearing member 124 fixed to the armatures 70, 110 and terminated in bearings 126 fixed to the motor mount plates 104, 106.

The armatures 70, 110 are connected together by a resilient coupling member 128 adapted to flexibly hold the armatures 70, 110 in their initial rest positions, provide a source of potential energy when stretched, and combine drive power produced by movement of the second armature 110 with drive power produced by movement of the first armature 70 for moving the cutter block 64 via the driver member 72. As an example, the resilient coupling member 128 may comprise first 130 and second 132 U-shaped leaf springs each connected to armature connecting arms 134, 136, by rivets 138. The first leaf spring 130 is connected between a top surface 140 of the first armature connecting arm 134 and a top surface 142 of the second armature connecting arm 136. The second leaf spring 132 is connected between a bottom surface 144 of the first armature connecting arm 134 and a bottom surface 146 of the second armature connecting arm 136. Thus, it will be appreciated that the resilient coupling member 128 is arranged to perform the functions provided by the coupling means 17 and resilient member 18 discussed above in reference to FIGS. 1 and 2.

A conductive path for an AC signal from a source, not shown, to the coils 96, 98 is provided by a cable 148 having a pair of conductors 150, 152 electrically connected to free ends of the coils 96, 98. The AC signal induces a magnetic flux in the cores 86, 86a which ultimately causes the armatures 70, 110 and resilient coupling member 128 to coact and angularly oscillate the armatures 70, 110 in opposite directions, to drive the cutter block 64 in a manner described above in reference to FIGS. 1 and 2.

Referring to FIG. 4, there is shown a cross-sectional side view of the laminated armatures 70, 110 balanced to reduce the amplitude of undesired vibrations. First, 150, second, 152, and third, 154 different-shaped plates or laminae of the same material and thickness may be used to form the laminated armatures 70, 110. The first plate 150 is symmetrically formed about an axis of symmetry to provide the previously described circumferentially spaced poles 112, 112a, 114, 114a with convex pole faces 116, 116a, 118, 118a on opposite ends. The second plate 152 includes the symmetrical form or shape of the first plate 150 and a first centrally located coplanar driver arm 156, or balancing arm 156a extending from the second plate 152 at a non-orthogonal angle to the axis of symmetry. The third plate 154 includes the form of the second plate 152 with a centrally located coplanar connecting arm 134, 136 extending from the third plate opposite and coaxial with the driver arm 156, or balancing arm 156a. The plates 150, 152, 154 have a common location for a central hole 158 and two lateral assembly holes 160 selected to permit the plates 150, 152, 154 to be assembled or stacked in different ways to form the armatures 70, 110. For example, the first armature 70 comprises three of the second plates 152 and five of the first plates 150 symmetrically assembled on either side of a single third plate 154 and held together by rivets 162 inserted through the lateral assembly holes 160 and the cylindrical bearing member 124 inserted through the central holes 158. Thus, the first armature 70 is a laminate of seventeen plates in all. The second armature 110 comprises the third plate 154 followed by seven of the second plates 152 and one of the first plates 150 symmetrically assembled on either side of the third plate 154 and held together by rivets 162 inserted through the central holes 158 to form a laminate of seventeen plates in all.

The oscillating first armature 70 provides a couple consisting of two equal magnitude forces, $F_1$, which are opposite in sense and directed along parallel non-colinear lines of action. Likewise, the oscillating second armature 110 provides a couple consisting of two equal magnitude forces, $F_2$, which are opposite in sense and directed along parallel non-colinear lines of action. However, the forces, $F_1$, and the couple generated by the first oscillating armature 70 are cancelled by the forces $F_2$ and the couple generated by the second oscillating armature 110 since the armatures 70, 110 are oscillating in opposite directions and the armatures 70, 110 are arranged as discussed above.

The number, shape and specific weights of the plates 150, 152, 154 forming the laminated armatures 70, 110 are selected so that the moment of inertia of the mass of the first armature 70 is substantially equal to the moment of inertia of mass of the second armature 110 and each armature 70, 110 is dynamically balanced with respect to its own axis of rotation. In addition, the angle of oscillation of the first armature 70 is substantially equal to the angle of oscillation of the second armature 110, whereby undesired vibrations of the motor 54 in the direction of the cutter block 64 movement are minimized. In particular, the armatures 70, 110 are formed to satisfy the equations:

$$W_1 R_1^2 = W_3 R_3^2$$

$$W_1 R_1 + W_3 R_3 = 2 W_2 R_2$$

where $W_1$ is the resultant weight of the cutter block 64, first armature driver arm 156, drive member 72 and a portion of the weight of the spring 62 and sponge 82 passing through a center of gravity, $C.G._1$, located at contact point $P_1$. $R_1$ is the length from the first armature pivot axis 164 to the location of $C.G._1$ and contact point $P_1$. $W_3$ is the resultant weight of the second armature balancing arm 156a passing through a center of gravity, $C.G._3$, located at point $P_3$. $R_3$ is the length from the second armature pivot axis 166 to the location point, $P_3$, of the center of gravity, $C.G._3$, of the second armature balancing arm 156a. $W_2$ is the resultant weight of the connecting arms 134, 136 of the armatures 70, 110 and a portion of the spring member 128 passing through a center of gravity, $C.G._2$, located on the connecting arms 134, 136 at point $P_2$. $R_2$ is the length from the pivot axes 164, 166 of the armatures 70, 110 to the center of gravity, $C.G._2$, located at point $P_2$.

A preferred embodiment of the invention has been shown and described. Various other embodiments and modifications thereof will be apparent to those skilled in the art. For example, the disclosed resilient member 128 need not be limited to a pair of U-shaped leaf springs 130, 132.

Figure 5:
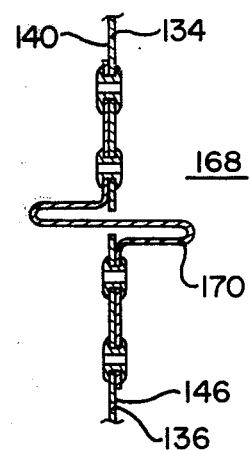
FIG. 5 is a side view of an S-shaped leaf spring adapted to be used in the vibratory motor.

Referring to FIG. 5, there is shown a side view of another embodiment of a suitable resilient coupling member in the form of an S-shaped leaf spring 170 having one end attached to the bottom surface 140 of the first armature connecting arm 134 and another end attached to the top surface 146 of the second armature connecting arm 136. In addition, the armatures 70, 110 may be provided with permanent magnets to achieve a frequency of oscillation equal to the frequency of the AC input signal, as well known in the art, and such a modification would fall within the true spirit and scope of the invention.

What is new and desirous to be secured by Letters Patent of the United States is:

1. A vibratory electromagnetic motor comprising:
   stator means having first and second pairs of opposed poles;
   first and second pivotally movable armature means each with armature poles, said first armature being pivotally mounted on a first axis of rotation with said first armature poles located adjacent to said first pair of stator poles and said second armature being pivotally mounted on a second axis of rotation with said second armature poles located adjacent to said second pair of stator poles to permit said first and second armature means to syncronously move about said first and second axes in opposite directions in response to a magnetic force; and
   resilient coupling means connected between said first and second armature means for combining drive power generated by said first moving armature means with drive power generated by said second moving armature means.

2. A vibratory electromagnetic in accordance with claim 1, wherein said stator means includes a laminated core and coil means wound around said core for magnetizing said core in response to an electrical signal.

3. A vibratory electromagnetic motor in accordance with claim 1, wherein a moment of inertia of mass of said first armature means with respect to said first axis of rotation of said first armature means is substantially equal to a moment of inertia of mass of said second armature means with respect to said first axis of rotation of said second armature means for minimizing vibrations.

4. A vibratory electromagnetic motor in accordance with claim 3, wherein said first armature means is dynamically balanced with respect to said first axis of rotation of said first armature means and said second armature means is dynamically balanced with respect to said axis of rotation of said second armature means for minimizing said vibrations.

5. A vibratory electromagnetic motor in accordance with claim 1, wherein said resilient coupling means include first and second U-shaped leaf springs.

6. A vibratory electromagnetic motor in accordance with claim 1, wherein said resilient coupling means include an S-shaped leaf spring.

7. A vibratory electromagnetic motor in accordance with claim 1, wherein said stator means includes first and second laminated cores of magnetically permeable material and first and second coils electrically connected in series and respectively wound around said first and second cores.

8. A vibratory electromagnetic motor comprising:
   a motor mount;
   stator means having first and second pairs of opposed poles immovably fixed to said motor mount;
   first and second pivotally movable armature means being respectively mounted on first and second axes of rotation on said motor mount, said first armature means having poles located adjacent to said first pair of stator poles, said second armature means having poles located adjacent to said second pair of stator poles to permit said first and second armature means to synchronously rotate in opposite directions in response to a magnetic force; and a leaf spring connected between said first and second armature means for establishing an initial armature position and combining drive power generated by said first rotating armature with drive power generated by said second rotating armature.

9. A vibratory electromagnetic motor in accordance with claim 8, wherein said stator means includes a first coil of electrically conductive wire wound around a first laminated core of magnetically permeable material and a second coil of electrically conductive wire wound around a second laminated core of magnetically permeable material, said first and second coils of wire being electrically connected in series.

10. A vibratory electromagnetic motor in accordance with claim 8, wherein said first armature means has a moment of inertia of mass with respect to an axis of rotation of said first armature means substantially equal to a moment of inertia of mass of said second armature means with respect to said second axis of rotation of said second armature means.

11. A vibratory electromagnetic motor in accordance with claim 10, wherein said first armature means is dynamically balanced with respect to said first axis of rotation of said first armature means and said second armature means is dynamically balanced with respect to said second axis of rotation of said second armature means.

12. In an electric shaver of the type having a movable cutter block means coupled to a first armature means of a vibratory electromagnetic motor having said first armature means and a second armature means pivotally mounted on a motor mount between a stator unit, the improvement comprising:
said stator unit having first and second pairs of poles;
said first and second armature means each having armature poles, said first armature means being mounted on a first axis rotation with said first armature poles located adjacent to said first pair of stator poles, and said second armature means being mounted on a second axis of rotation with said second armature poles located adjacent to said second pair of stator poles to permit said first and second armature means to synchronously rotate in opposite directions in response to a magnetic force; and
resilient coupling means connected between said first and second armature means for establishing an initial armature position and combining drive power generated by said first rotating armature means with drive power generated by said second rotating armatue means to move said cutter block coupled to said first armature means.

13. The electric shaver according to claim 12, wherein a moment of inertia of mass of said first armature means and said cutter block means with respect to said first axis of rotation of said first armature means is substantially equal to a moment of inertia of mass of said second armature means with respect to said second axis of rotation of said second armature means for minimizing vibrations.

14. The electric shaver according to claim 13, wherein said first armature means is dynamically balanced with respect to said first axis of rotation of said first armature means and said second armature means is dynamically balanced with respect to said axis of rotation of said second second armature means for minimizing said vibrations.

15. The electric shaver according to claim 12, wherein said stator unit includes a laminated core and coil means wound around said core for magnetizing said core in response to an electric signal.

16. The electric shaver according to claim 12, wherein said resilient coupling means include first and second U-shaped leaf springs.

17. The electric shaver according to claim 12, wherein said resilient means include an S-shaped leaf spring.

18. The electric shaver according to claim 12, wherein said first armature means includes a driver arm coupled to said cutter block means and said second armature means includes a balancing arm for counterbalancing said cutter block means and said driver arm of said first armature means.

19. A vibratory electromagnetic motor comprising:
stator means having first and second pairs of opposed poles;
first and second pivotally movable armature means each with armature poles, said first armature means being mounted on a first axis of rotation with said first armature poles being located adjacent to said first pair of stator poles, and said second armature means being mounted on a second axis of rotation with said second armature poles being located adjacent to said second pair of stator poles;
means for coupling said first armature means to said second armature means to permit said first and second armature means to synchronously move in opposite directions in response to a magnetic force and to combine drive power generated by said first moving armature means with drive power generated by said second moving armature means; and
resilient means being connected to said first and second armatures to establish an initial position for said first and second armature poles relative to said stator poles and to form a resonant mechanical system with said first and second armature means.

* * * * *

UNITED STATES PATENT AND TRADEMARK OFFICE
CERTIFICATE OF CORRECTION

PATENT NO. : 4,160,177
DATED : July 3, 1979
INVENTOR(S) : Enzo Ascoli

It is certified that error appears in the above-identified patent and that said Letters Patent are hereby corrected as shown below:

Column 2, line 22, after "Operated" insert -- Dry --.

Column 8, line 29, after "electromagnetic" insert -- motor --.

Column 8, line 46, after "said" (first occurence) insert -- second --.

Signed and Sealed this

Nineteenth Day of February 1980

[SEAL]

Attest:

SIDNEY A. DIAMOND

Attesting Officer

Commissioner of Patents and Trademarks